G. A. HURST.
SAGE BRUSH GRUBBER.
APPLICATION FILED MAR. 4, 1916.
1,201,967.
Patented Oct. 17, 1916.
2 SHEETS—SHEET 1.
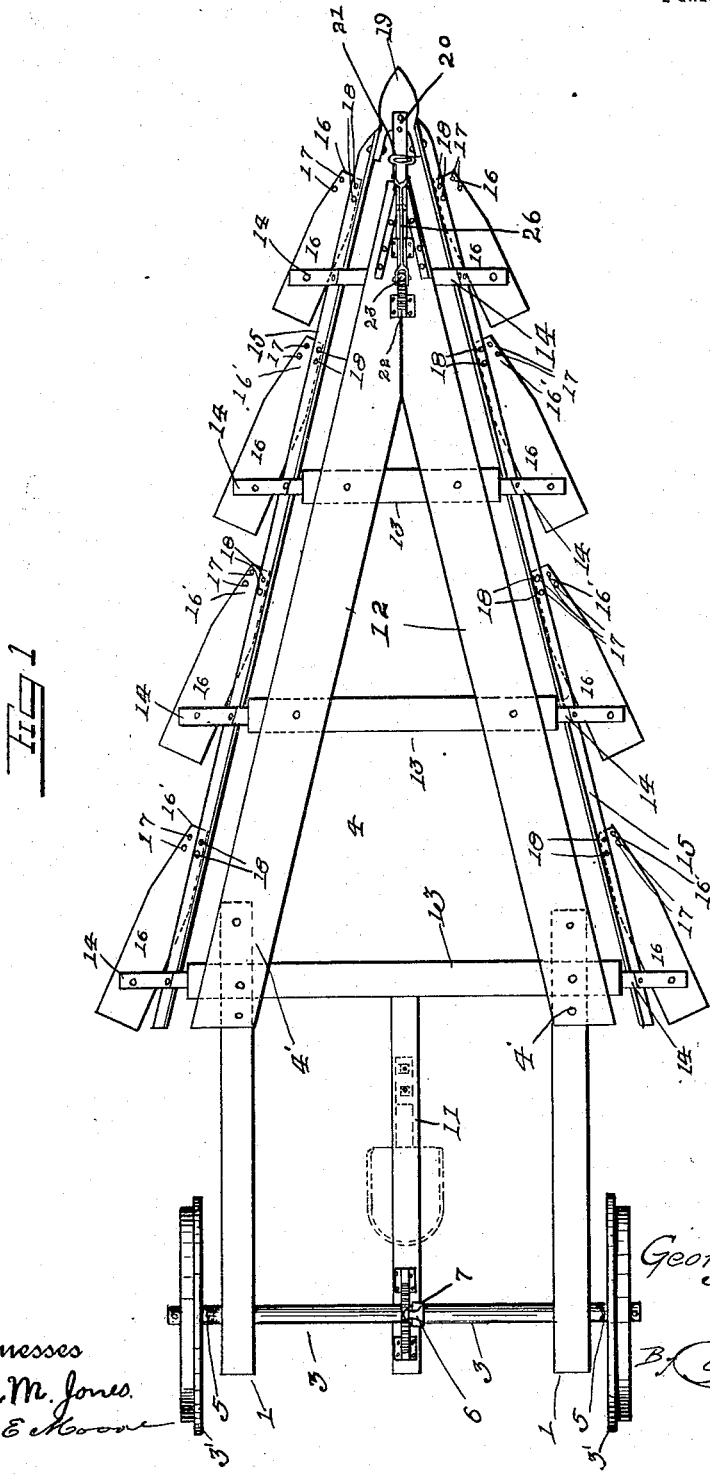

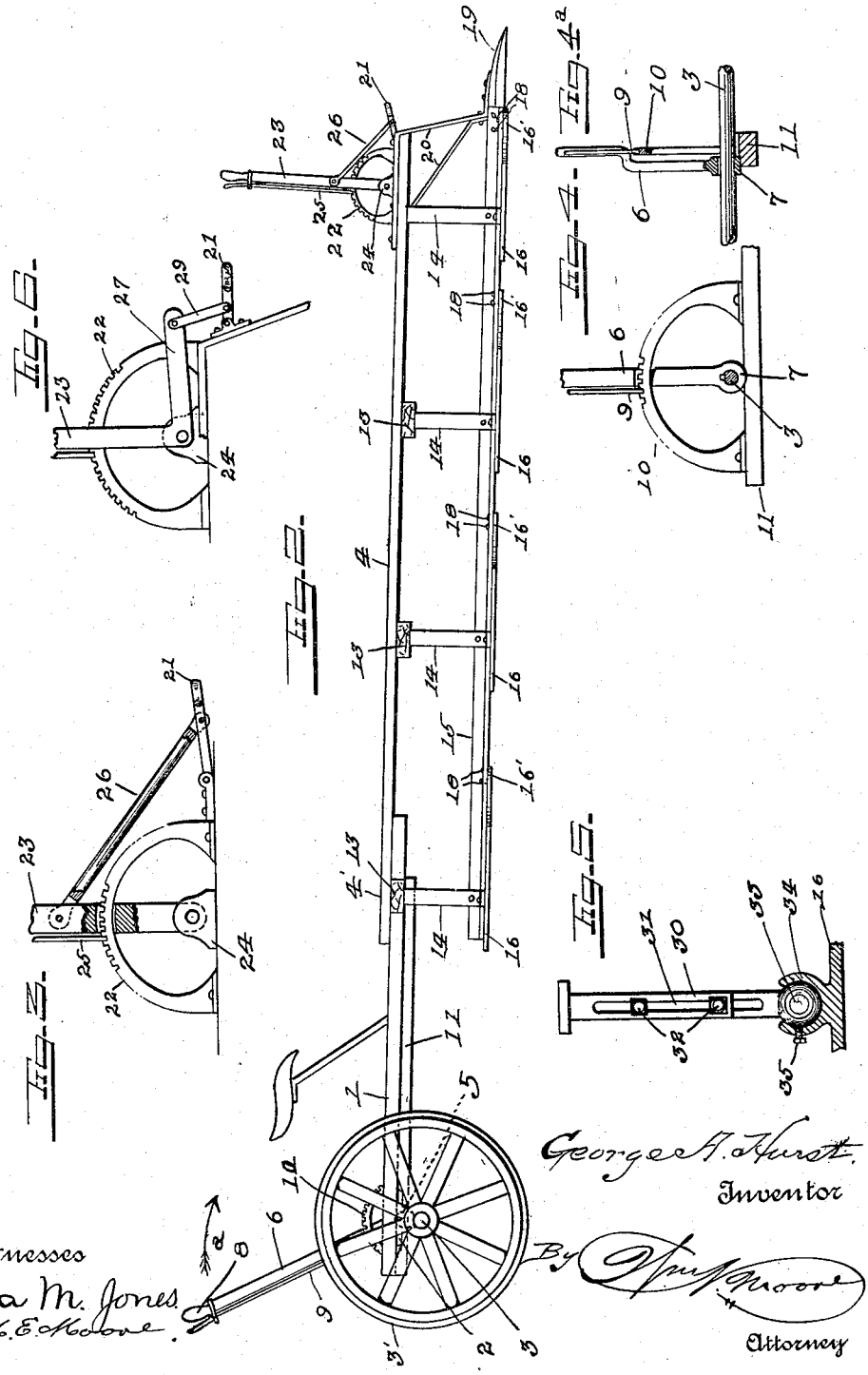

UNITED STATES PATENT OFFICE.

GEORGE A. HURST, OF BLANDING, UTAH.

SAGE-BRUSH GRUBBER.

1,201,967. Specification of Letters Patent. Patented Oct. 17, 1916.

Application filed March 4, 1916. Serial No. 82,016.

*To all whom it may concern:*

Be it known that I, GEORGE A. HURST, a citizen of the United States, residing at Blanding, in the county of San Juan and State of Utah, have invented certain new and useful Improvements in Sage-Brush Grubbers, of which the following is a specification.

My invention relates to improvements in agricultural implements, and refers particularly to what are generally known as sage brush grubbing implements or plows, one object being the provision of an implement of this character which will be light of draft and readily capable of cutting the brush near the ground surface, or be adjusted to enter the soil for the purpose of cutting the brush or roots and which implement will be efficient under all conditions.

Another object of my invention is the provision of a grubbing implement which can be readily transported from place to place and quickly thrown into operation or thrown out of use and which will be of simple, cheap, strong and durable construction to withstand the hard usage to which such a machine will be subjected.

A further object of my invention is the provision of a grubbing implement which can be easily and quickly adjusted and adapted for the required service, which will not be likely to break or get out of order, and which generally will be thoroughly efficient and practical.

With the above and other objects in view which will appear as the description proceeds, the invention consists in the novel construction, combination and arrangement of parts, hereinafter described and claimed, it being understood that changes in the precise embodiment of the invention herein disclosed can be made without departing from the spirit of the invention.

In the accompanying drawings, I have illustrated one complete example of the physical embodiment of my invention constructed according to the best mode I have so far devised for the practical application of the principles of my invention.

Figure 1 represents a top plan view of my invention, the adjustable axle and wheels being in the position they occupy when the implement is being transported. Fig. 2 is a side elevation thereof. Fig. 3 is an enlarged detail view of the novel means for adjusting the draft of the implement. Fig. 4 is an enlarged detail view of the novel means for adjusting the wheels to allow the transportation of the implement. Fig. 4ᵃ is an end view thereof, partly broken away. Fig. 5 is a detail view partly in section of a modified form of adjustable securing means for the blades of the implement, and Fig. 6 is a detail view of a modified form of construction of the draft adjusting means.

The implement consists of the rectangular shaped traction frame or truck 1, to which is secured the bearing boxes 2, having journaled therein the axle 3 carrying the wheels 3', and the angular or tapered frame 4, having its inner or wider ends 4', secured to the truck 1, said angular or tapered frame 4, having secured thereto the cutting or grubbing means, as will be hereinafter more clearly described.

The axle 3 is offset or cranked as at 5 to permit the lifting of the implement above the ground surface for transportation and to effect the lifting of the implement, I employ the lever 6 which has its lower end 7, keyed to the axle 3, and its upper end forming the hand grasping portion 8.

For securing the lever 6 in its adjusted position I employ the pawl 9, secured to the lever 6 in the usual way, adapted to engage the teeth upon the ratchet bar 10, secured to the center support or brace 11 of the truck 1.

Thus it will be seen that when it is desired to place the implement in operative position the lever 6, is moved in the direction of arrow *a*, in Fig. 2 to the desired distance and that the pawl 9 will engage the toothed bar 10, and secure the implement in the desired adjustment.

The frame 4, consists of the two converging rails or strips 12, and the cross braces 13, and to said cross braces are secured the brackets 14, to which are secured the blade carrying angle irons or rails 15.

The blades 16 are of rectangular shape and have in their front double cutting end 16' the four holes 17, two of which are secured to the angle irons or rails 15 by any suitable means 18. The blades are made rigid on the angle irons 15 by the brackets 14, which extend beyond the irons 15 and are secured to the blades.

The blades 16, each have double cutting edges 16', and the four holes 17, two on each side of said blades which makes the blades interchangeable, as when one of the tapered cutting edges 16' becomes worn the blade can be reversed, placing the other side to the outside as will be readily understood.

To force the front end of the implement into the soil when in use, I employ the novel plow point 19, secured to the front ends of the angle rails or strips 15, and the plow point is further supported and braced by the trusses 20, this arrangement effectively forcing the blades into the soil to cut the roots of the brush.

For regulating the entering of the plow point 19, into the soil I use the novel means of governing the draft of the implement, which consists of the ring 21, to which is attached the draft means which may be either horse or any form of tractor, said ring being pivoted to the end of the frame 4, and the curved toothed bar 22, secured to said frame, the lever 23 pivoted in the block 24 secured to the frame, said lever 23 having its end formed with a hand grasping portion, and having secured thereto the pawl 25. The lever 23 is pivotably secured to the ring of the connecting rod or link 26, and as will be readily apparent, when the ring 21 is raised the plow point 19 will be forced deeper into the soil and when lowered will run nearer the surface.

In Fig. 6, I have illustrated a modified form of adjusting ring in which the lower end of the lever 23 is formed with the bar 27 at right angles to the lever and the ring 21 is pivotably secured in the block 28 on the front end of the truss frame 20, the ring and bar 27 being connected by the link 29.

In Fig. 5 I have illustrated a modified form of adjustable bracket which permits the easy adjustment of the blades, which consists of the two piece bracket 30 formed with the slots 31 and having the suitable securing means 32 for holding the bracket in adjusted position. The lower portion of the bracket 30 is formed with the ball 33 which is pivotably secured in the socket 34, formed on the blades, and is held in the desired angle or position by means of the set screws 35.

It will thus be seen that I provide a machine which will perform every function for which it is designed in an efficient and practical manner, and which can be produced at a very low price, all things considered.

I claim:—

A sage brush grubbing implement, consisting of a rectangular truck frame, an adjustable axle mounted thereon, wheels mounted on said axle, a V-shaped frame extending from said rectangular truck frame, cross braces secured to the under side of said V-shaped frame, brackets secured to said braces, rails secured to said brackets forming a converging frame, a plurality of reversible blades secured to said converging frame, and a plow point secured rigidly to the outer ends of said converging frame, said blades being of oblong shape and having double cutting edges.

In testimony whereof I affix my signature in the presence of two witnesses.

GEORGE A. HURST.

Witnesses:
Jos. B. Harris,
Thos. M. Carroll.

Copies of this patent may be obtained for five cents each, by addressing the "Commissioner of Patents, Washington, D. C."